United States Patent
Miehls et al.

(10) Patent No.: US 6,284,187 B1
(45) Date of Patent: Sep. 4, 2001

(54) BLOW MOLDING NEEDLE FOR LIQUID COOLING

(75) Inventors: Brad Alan Miehls, Holland, OH (US); Bradley Allen Silvius, Ypsilanti, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/301,232

(22) Filed: Apr. 28, 1999

(51) Int. Cl.⁷ ............................. B29C 49/60; B29C 49/66
(52) U.S. Cl. ..................... 264/528; 264/540; 425/526; 425/536
(58) Field of Search ........................ 425/526, 536; 264/528, 540

(56) References Cited

U.S. PATENT DOCUMENTS

| | | | |
|---|---|---|---|
| 3,358,062 | * 12/1967 | Lemelson | 425/526 |
| 3,505,442 | * 4/1970 | Culpepper | 425/526 |
| 3,571,848 | * 3/1971 | Szajna | 425/536 |
| 3,767,350 | * 10/1973 | Horberg, Jr. et al. | 425/526 |
| 3,937,610 | 2/1976 | Farrell | 425/526 |
| 4,859,397 | * 8/1989 | Peters | 425/536 |
| 5,498,390 | 3/1996 | Sterzel | 264/532 |
| 5,565,165 | 10/1996 | Matsuhashi | 425/536 |
| 5,759,475 | 6/1998 | Takakusaki et al. | 425/526 |

FOREIGN PATENT DOCUMENTS

| | | |
|---|---|---|
| 2009658 A1 | 6/1979 | (GB) . |
| 2342066 | 4/2000 | (GB) . |
| 2-063719 | 3/1990 | (JP) . |
| 3153336 | 7/1991 | (JP) . |
| 4-358820 | * 12/1992 | (JP) . |
| 5-104616 | 4/1993 | (JP) . |
| 6-234153 | 8/1994 | (JP) . |
| 9239819 | 9/1997 | (JP) . |

* cited by examiner

Primary Examiner—Robert Davis
(74) Attorney, Agent, or Firm—Brinks Hofer Gilson & Lione

(57) ABSTRACT

A blow-needle assembly for cooling the blow molded article with a liquid. The apparatus utilizes a mold having a mold surface and a passage therethrough. The passage has a passage wall that acts a one sealing surface. The apparatus using a hollow blow needle that slides axially within said passage. The needle has a tip, a narrow shank adjacent to the tip, a wide shank, a tapered portion between said narrow and wide shank and an aperture therethrough. The aperture communicates cooling liquid to the interior of a blown article. The needle is movable between retracted and extended positions. The needle tip is positioned generally recessed of the mold surface when said needle is in the retracted position and above the mold surface when the needle is in the extended position.

15 Claims, 2 Drawing Sheets

BLOW MOLDING NEEDLE FOR LIQUID COOLING

BACKGROUND OF THE INVENTION

1. Field of the Invention

The present invention is directed to a blow-needle assembly for cooling a blow-molded article with a liquid. More specifically, the present invention is directed to a blow-molding needle that pierces a plastic parison and forms a fluid tight seal between the needle and mold surface by compressing the plastic parison between the blowing needle and an aperture in the mold.

2. Description of the Related Art

U.S. Pat. No. 3,937,610 ('610) teaches a method of cooling the interior of a blow molded article with a liquid mist. The '610 patent is directed to a method for reducing the cycle time of molding a blown article by reducing the time needed to cool the article before it can be removed from the mold. After the article is blown, small globules of liquid are circulated through the interior of the article. The liquid evaporates when it contacts the hot plastic wall, thus reducing the temperature of the blown article. Air is circulated within the article to evaporate any remaining liquid. A volume of cooling liquid is not circulated within the interior of the article. Only small liquid globules suspended within the mist contact the article walls. While the method described in the '610 patent reduces the time needed to cool the article, the cycle time reduction is not as great as in the present invention. The liquid globules suspended within the mist do not have sufficient capacity to rapidly cool thick-walled blow molded articles when compared to a solid liquid medium.

Two additional references which also teach including liquid within the blowing medium are U.S. Pat. No. 5,498,390 and Japanese Patent Application No. 05-023094. These references similarly require that the cooling liquid be suspended within the blowing medium and evaporate upon contact with the hot parison walls. While this method of manufacturing blow molded articles reduces the cycle time when compared with ambient cooling, it does not provide the rapid cooling of the present invention due to the superior ability of liquid water to remove heat energy.

Japanese Patent Application No. 05-104616 ('616) teaches a method of making a container by blow molding. After the container has been blow molded, a cooling liquid is introduced into the interior of the molded article. This is known as "water casting" where a quantity of cooling liquid equal to the volume of the container is introduced and held within the article. The amount of heat removed from the article is limited by the volume of water. In the present invention, the cooling liquid is circulated through the article and more than the container volume of cooling liquid may be circulated through the article to remove more heat. The present invention also introduces a constant "in-out" flow of water, creating turbulence. Turbulent flow inside the article provides the greater thermal cooling.

The '616 patent application teaches a method of molding a container around a blowing mandrel. The parison seals between the outer perimeter of the water inlet and the mold to form a fluid-tight seal. Sealing between the parison and the water inlet system has been a key impediment for using liquid cooling for blow molding. Most mold applications do not support the use of a mandrel between the mold walls. In these applications, needle or pin is used to pierce the parison and inject cooling liquid into the molded article. Forming a fluid-tight seal between the parison and the needle is necessary to implement liquid cooling.

U.S. Pat. No. 5,565,165, ('165) teaches a blow-molding apparatus having two blow needles, one having a larger diameter and the other having a smaller diameter. The smaller diameter needle is used to inflate the parison and hold the parison against the mold surface while the larger diameter needle pierces the parison. The larger diameter needle is capable for ventilating the interior portion of the article with a larger quantity of cooling fluid. The small and large diameter needles have a tip, small diameter shank, large diameter shank and tapered portion between the large diameter shank.

U.S. Pat. No. 5,759,475 ('475), teaches a blow-molding needle having blowing inlets positioned slightly behind the needle tip. This enables the blowing inlets to be constructed of a larger diameter than if they had passed through the needle tip.

Neither the '165 patent nor the '475 patent are directed to a blow-molding apparatus that cools the interior surface of a molded article with a liquid. Both use a gas to cool the parison. The needle tapered portions do not appear to contact the parison wall during the inflation process and do not act as a fluid-tight sealing surface.

The present invention is useful for applications where a fluid tight seal is required between the blowing needle and the mold surface. These and other disadvantages of the prior art are overcome by the method taught in the present invention.

SUMMARY OF THE INVENTION

The present invention is directed to a blow-needle assembly for cooling the blow molded article with a liquid. The apparatus utilizes a mold having a mold surface and a passage therethrough. The passage has a passage wall that acts as one sealing surface. The apparatus uses a hollow blow needle that slides axially within said passage. The needle has a tip, a narrow shank adjacent to the tip, a wide shank, a tapered portion between said narrow and wide shank and an aperture therethrough. The aperture communicates cooling liquid to the interior of a blown article. The needle is movable between retracted and extended positions. The needle tip is generally recessed of the mold surface when said needle is in the retracted position and above the mold surface when the needle is in the extended position.

The tip pierces a plastic parison within the mold when the needle is moved from the retracted to the extended position. A gap is created between the needle and the passage wall. As the parison is inflated, a quantity of plastic parison fills the gap. As the needle is moved from the retracted to the extended position, the tapered portion contacts the parison within the gap and compresses the parison between the passage wall and the needle to form a fluid-tight seal.

These and other objects, features, and advantages of the present invention will become more readily apparent when viewed in connection with the accompanying drawings wherein like reference numerals correspond to like components.

DETAILED DESCRIPTION OF THE PREFERRED EMBODIMENTS

Figure 1:
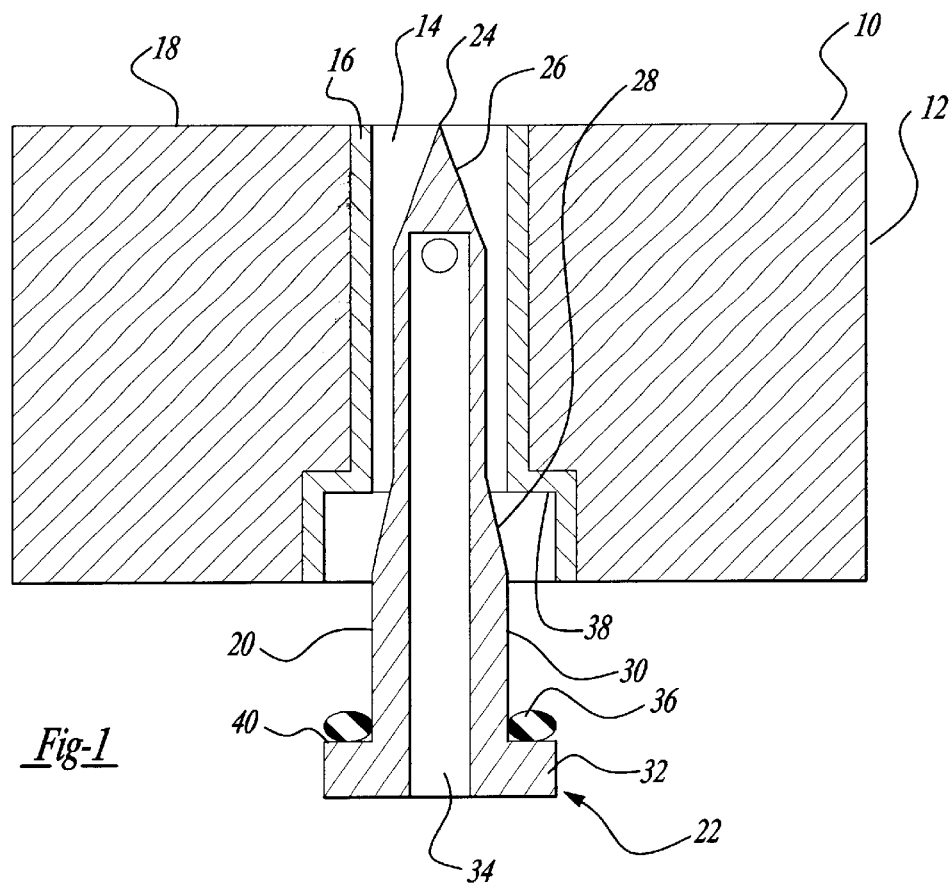
FIG. 1 is a cross-sectional view of the blow-molding apparatus with the needle in the retracted position.

The present invention will be described through a series of drawings, which illustrate the blow molding apparatus claimed. The drawings illustrate a one-piece blow needle. Other blow-needles may be manufactured using the same or similar construction and are included within the invention described herein.

The following elements are a word list of the items described in the drawings and are reproduced to aid in understanding the invention.

| Ref. No. | Element Name |
|---|---|
| 10 | Blow-Molding Apparatus |
| 12 | Mold |
| 14 | Passage |
| 16 | Wear Resistant Sleeve |
| 18 | Mold Surface |
| 20 | Needle |
| 22 | Retracted Position |
| 24 | Tip |
| 26 | Narrow Shank |
| 28 | Tapered Portion |
| 30 | Wide Shank |
| 32 | Base |
| 34 | Aperture |
| 36 | Annular Seal |
| 38 | Back Surface |
| 40 | Shoulder Surface |
| 42 | Parison |
| 44 | W-shaped Section |
| 46 | Gap |
| 48 | Passage Wall |
| 50 | Extended Position |
| 52 | Parison Portion |
| 54 | Boss |

Illustrated in FIG. 1 is a cross-section view of a blow-molding apparatus 10. The blow-molding apparatus 10 contains a mold 12 having a passage 14. The mold 12 is that normally used in blow-molding and is often made from tool steel, stainless steel or aluminum. The passage 14 contains a wear resistant sleeve 16. The sleeve 16 is press fit within the passage 14 and provides a wear-free medium for needle travel. The mold 12 has a mold surface 18 that imparts a shape to the molded article.

A blow molding needle 20 slides axially within the passage 14. The needle 20 is shown in the retracted position 22. The needle 20 has a tip 24 that generally lies recessed of the mold surface 18 when the needle 20 is in the retracted position 22. The needle 20 contains a narrow shank 26 adjacent to the tip 24. Adjacent to the narrow shank 26 is a tapered portion 28. Adjacent to the tapered portion 28 is a wide shank 30. Opposite to tip 24 is a base 32. The tip, narrow shank 26, tapered portion 28, wide shank 30 and base 32 are radially aligned along the axis of the needle 20.

An aperture 34 is passed through the needle 20 and communicates blow-molding gas and cooling liquid to the interior of the mold 12. Aperture 34 is generally sized to allow for the inflow and outflow of a quantity of cooling liquid several times or more than the volume of the molded article within the cooling cycle for the molding operation.

The aperture 34 generally communicates through the sides of narrow shank 26 to avoid a build-up of parison material within the aperture 34. An annular seal 36, generally made from a rubber O-ring, seals between a back surface 38 on the mold 12 and a shoulder surface 40 on the base 32. The annular seal 36 forms a fluid-tight seal between the interior and exterior of the mold 12.

Figure 2:
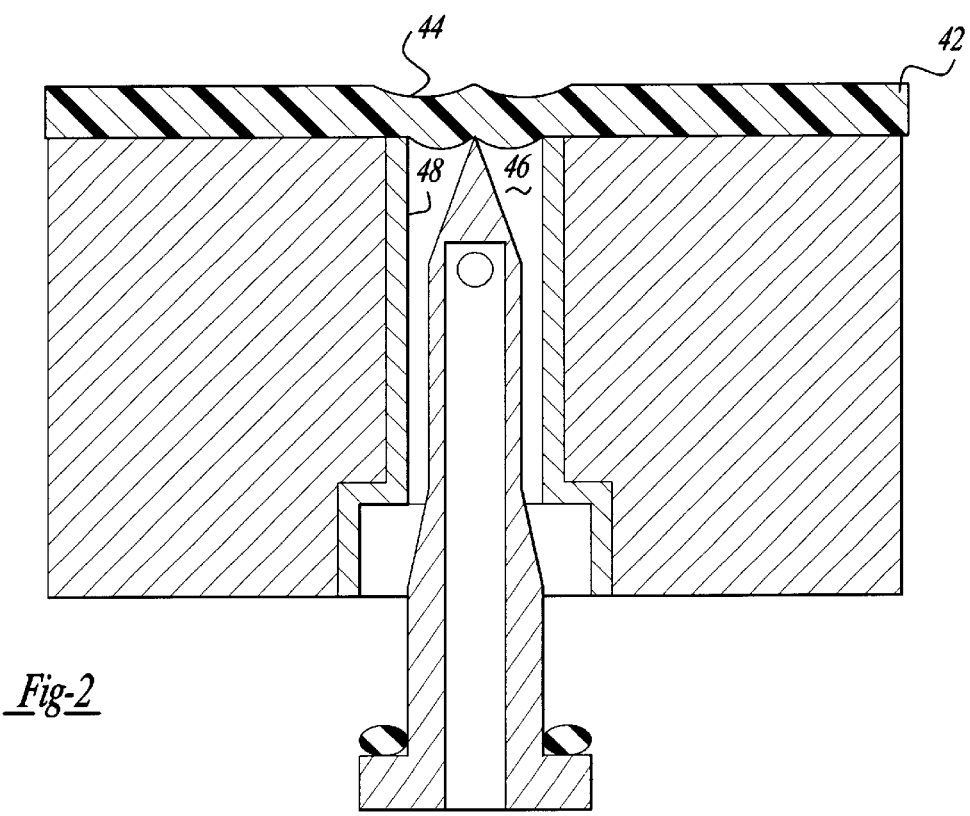
FIG. 2 is a cross-sectional view of the blow-molding apparatus illustrated in FIG. 1, with a parison placed in the mold.

A plastic parison 42 is extruded by an extruder (not shown) within the blow-molding apparatus 10. The mold 12 is moved to a closed position and the plastic parison 42 is located adjacent to the mold surface 18 as shown in FIG. 2. The parison 42 is partially inflated and forms a W-shaped 44 section in the area over the tip 24. The parison extends into a gap 46 that lies between the needle 20 and the wall 48 of the passage 14. The needle 20 is still in the retracted position 22.

Figure 3:
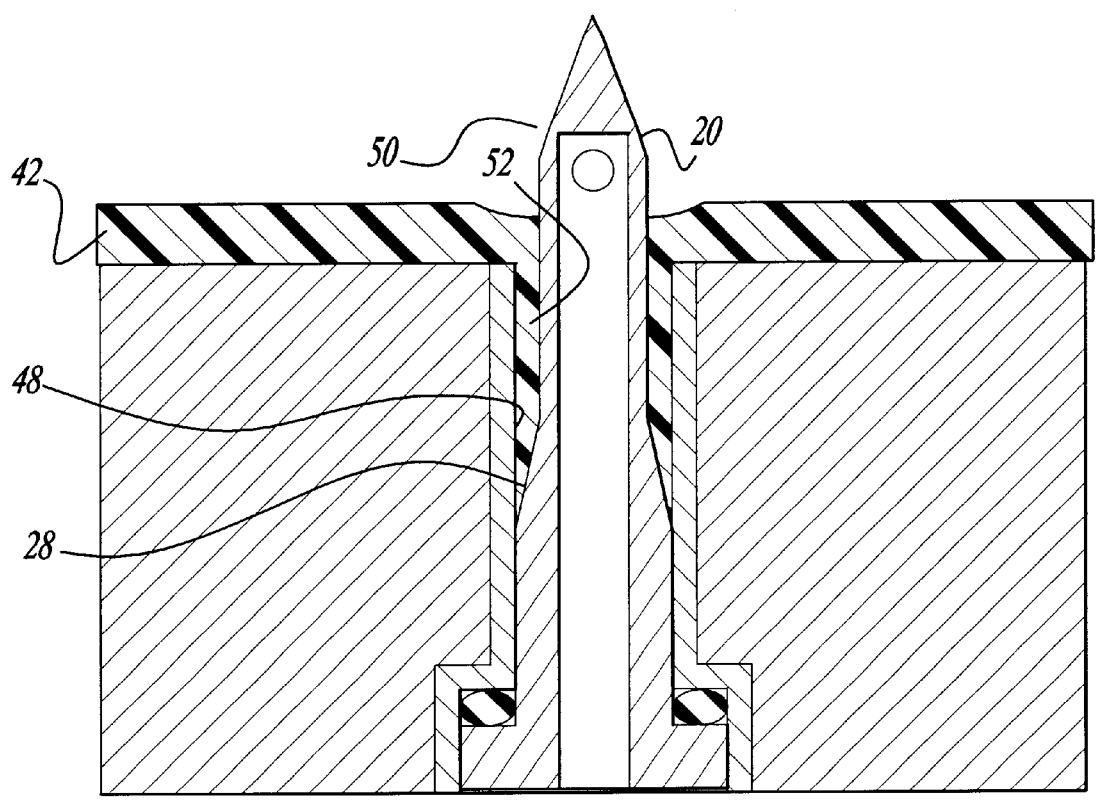
FIG. 3 is a cross-sectional view of the blow-molding apparatus illustrated in FIG. 2, with the needle moved to the extended position.

The needle 20 is moved axially from the retracted position 22 to an extended position 50 as illustrated in FIG. 3. The tip 24 pierces the parison 42. A portion 52 of the parison 42 forced further into the gap 46 by the inflation pressure within the mold 12. Inflation gas may be injected through the aperture 34 to complete inflation of the article. The forward axial movement to the needle 20 together with the rearward movement of the parison portion 52, causes the parison portion 52 to become squeezed between the tapered portion 28 and the passage wall 48. The compression of the parison portion 52 between the needle 20 and the passage wall 48 creates a fluid-tight seal around the needle 20.

The invention is particularly well suited for use with a liquid cooled blow-molding apparatus as illustrated in commonly assigned U.S. patent application, Ser. No. 09/301,233, Titled: "LIQUID COOLED BLOW MOLDED ARTICLE", filed on even date herewith and incorporated herein by reference. The liquid cooling method described requires a high pressure fluid-tight seal between the blow-molding needle and the parison so that the cooling liquid does not leak or escape from within the molded article. It is this sealing feature that has been an impediment to the widespread use of liquid cooling for blow-molded articles.

After the article has cooled sufficiently to be removed from the mold 12, the needle 20 is moved to the retracted position 22 as shown in FIGS. 1 and 2 and molded article is removed from the mold. A small boss may surround the aperture created by the needle 20. The boss may be removed if a smooth finish is required, or the boss may serve as an attachment point for the molded article.

While the best modes for carrying out the invention have been described in detail, those familiar with the art to which this invention relates will recognize various alternative designs and embodiments for practicing the invention as defined by the following claims.

What is claimed:

1. A blow-needle assembly for liquid cooling comprising:
   a mold having a mold surface and a passage therethrough, said passage having a passage wall; and
   a blow-needle having a tip, a narrow shank adjacent said tip, a wide shank, a tapered portion between said narrow and wide shank and an aperture therethrough, said aperture communicating cooling liquid to the interior of said mold, said needle being movable between retracted and extended positions and said tip being positioned generally recessed of said mold surface when said needle is in said retracted position and above said mold surface when in said extended position, said tip piercing a plastic parison within said mold when said needle is moved from said retracted to said extended position and said tapered portion compressing said parison between said tapered portion and said passage wall to form fluid tight seal therebetween.

2. The blow-needle assembly of claim 1, further comprising;

a base portion on said needle adjacent said wide shank;

and a back surface on said mold positioned opposite to said mold surface.

3. The blow-needle assembly of claim 1, wherein said blow-needle slides axially within said passage.

4. The blow-needle assembly of claim 2, wherein said base portion contacts said back surface when said needle is fully inserted into said passage.

5. The blow-needle assembly of claim 4, further comprising an annular seal between said back surface and a shoulder surface on said base portion providing a fluid tight seal therebetween.

6. The blow-needle assembly of claim 1, further comprising a wear resistant sleeve between said needle and said passage.

7. The blow needle assembly of claim 1, further comprising a gap between said passage wall and said needle, whereby a portion of said parison is forced into said gap and becomes compressed between said tapered portion and said passage wall to form said seal.

8. A blow-needle assembly for liquid cooling comprising:

a mold having a mold surface and a back surface and a passage therethrough, said passage having a passage wall; and a blow-needle having a tip, a narrow shank adjacent said tip, a wide shank, a tapered portion between said narrow and wide shanks, a base portion adjacent said wide shank, said base portion surrounded by an annular seal and an aperture therethrough, said aperture communicating cooling liquid to the interior of said mold, said needle being movable axially between retracted and extended positions and said tip being positioned generally recessed of said mold surface when said needle is in said retracted position and above said mold surface when in said extended position, said tip piercing a plastic parison within said mold when said needle is moved from said retracted position to said extended position, said annular seal sealing between said base and said back surface, and said tapered portion compressing said parison between said tapered portion and said passage wall to form fluid tight seal therebetween.

9. The blow-needle assembly of claim 8, further comprising a wear resistant sleeve between said needle and said passage.

10. The blow needle assembly of claim 8, further comprising a gap between said passage wall and said needle, whereby a portion of said parison is forced into said gap and becomes compressed between said tapered portion and said passage wall to form said seal.

11. A method of sealing around a blow-needle comprising the steps of:

providing a mold having a mold surface and a back surface and a passage therethrough, said passage having a passage wall;

extruding a plastic parison adjacent said mold surface;

positioning a blow-needle within said passage, said needle having a tip, a narrow shank adjacent said tip, a wide shank, a tapered portion between said narrow and wide shanks, a base portion adjacent said wide shank, said base portion surrounded by an annular seal and an aperture therethrough;

inflating said parison;

extending said needle and piercing said parison with said tip, a portion of said parison being forced into a gap between said needle and said passage wall and said parison portion being compressed between said tapered portion and said passage wall to form a fluid-tight seal therebetween.

12. The method of claim 11, further comprising the step of compressing said annular seal between said base and said back surface to form a seal therebetween.

13. The method of claim 11, wherein said needle communicates inflation fluid into said mold.

14. The method of claim 11, wherein said needle communicates cooling liquid into said mold.

15. A blow-needle assembly for liquid cooling comprising:

a mold having a mold surface and a passage therethrough, said passage having a passage wall; and a blow-needle having a tip, a narrow shank adjacent said tip, a wide shank, a tapered portion between said narrow and wide shanks and an aperture therethrough, said aperture communicating cooling liquid to the interior of said mold, said needle being movable between retracted and extended positions wherein said tip pierces a plastic parison within said mold when said needle is moved from said retracted to said extended position and said tapered portion compresses said parison between said tapered portion and said passage wall to form a fluid tight seal therebetween.

\* \* \* \* \*